April 3, 1945. W. I. TAYLOR 2,372,695
PRODUCTION OF THERMOPLASTIC MATERIALS IN FIBROUS OR CELLULAR FORM
Filed May 15, 1940
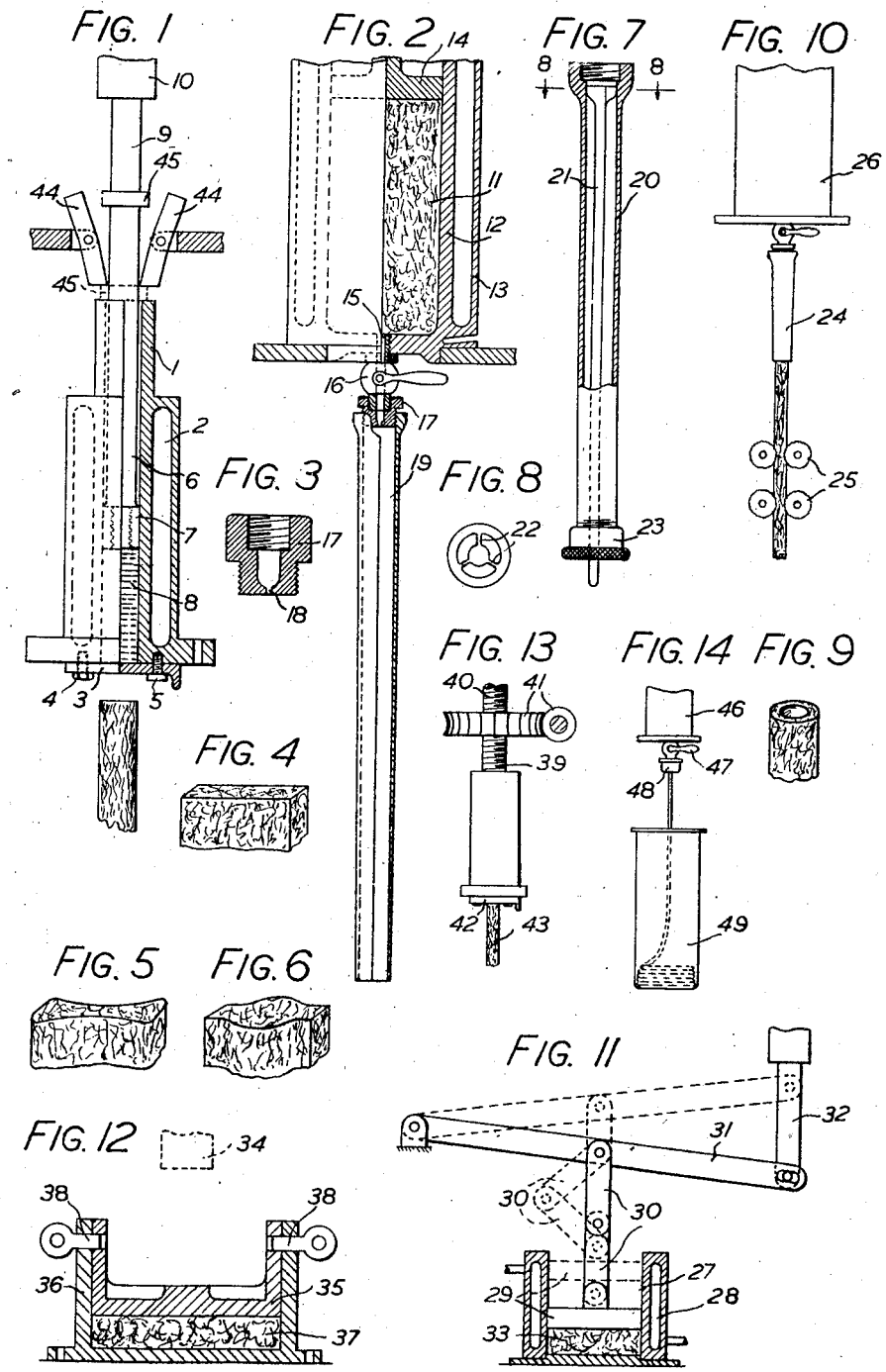
W. I. TAYLOR
INVENTOR
A. TORNEYS Patented Apr. 3, 1945

2,372,695

UNITED STATES PATENT OFFICE 2,372,695

PRODUCTION OF THERMOPLASTIC MATERIALS IN FIBROUS OR CELLULAR FORM

William Ivan Taylor, Spondon, near Derby, England, assignor to Celanese Corporation of America, a corporation of Delaware Application May 15, 1940, Serial No. 335,262
In Great Britain June 8, 1939

7 Claims. (Cl. 18—48)

This invention relates to improvements in or relating to the production of thermoplastic materials in fibrous or cellular form and in particular to materials of this character having a basis of cellulose acetate or other organic derivatives of cellulose.

According to the invention a composition comprising a thermoplastic material, e. g., an organic derivative of cellulose, and a solvent liquid in such concentration as not to be flowable under ordinary temperatures and pressures is subjected in a closed chamber to a very high pressure at an elevated temperature. When the temperature of the composition is substantially uniform throughout the mass, the pressure is suddenly released to permit rapid vaporisation of the solvent and drying of the material into a mass of low specific gravity. The release of pressure may be arranged to permit expansion of the mass into the chamber in which it is confined during the application of the high temperature and pressure, the mass thereupon assuming the dimensions and shape of the chamber. The release, however, may be effected through an aperture in the chamber to permit the mass to be extruded either into the atmosphere or into some container.

The amount of solvent used with the thermoplastic material may be such that the composition will just not flow under ordinary temperatures and pressures, for example a cellulose-acetate/acetone composition containing 45% by weight of the cellulose acetate may be employed. A composition of this character, i. e., one containing a relatively large proportion of solvent, may be used to produce a cellulose acetate mass in the form of a highly voluminous continuous thread by permitting extrusion of the heated composition from the pressure chamber through a relatively small hole, say 0.125 or 0.25 of an inch diameter. The heated mass is extruded at a high rate and rapidly dries in fluffy thread-like form, apparently fibrous in character, but continuous in structure. The individual fibres may be very fine, even much less than 1 denier (the unit of size of artificial textile filaments), but, by being connected together at intervals, they make the thread extremely light in character, it having an apparent specific gravity of about 0.02.

Lesser proportions of solvent may be employed, for example by working up a composition of relatively low concentration on malaxating rolls until a stiff mass is produced containing 80–90% or more of the cellulose derivative. Such a mass the pressure chamber, or broken or ground into a granular mass. Upon extrusion from the pressure chamber, the rapid evaporation of the solvent causes the mass to set in rod-like form in the case of extrusion into the open atmosphere, or into shapes determined by moulds into which the mass may be allowed to expand. Pith-like bodies are thus produced having apparent specific gravities as low as 0.02, although relatively denser products having specific gravities up to 0.05 or 0.1 or more may be obtained by limiting the amount of expansion that takes place on release of pressure from the heated composition and/or by varying the nature of the composition. The pith may be resilient or rigid, depending upon the size of the cavities produced by the evaporation of the solvent, this in turn depending upon such conditions as the quantity of solvent originally present and the amount of pressure employed, the rate of extrusion, and the shape and temperature of the mould, if any, used to receive the extruded material. The material contacting with the surface of the mould tends to form a solid skin on the article. This skin assists in imparting rigidity, and is also suitable to receive a varnish or other coating.

The composition may be extruded into tubular moulds to impart a rod-like shape, or into tubes or other shaped articles of a cellulose derivative or other material so as to fill them and impart rigidity thereto with little addition of weight.

The temperature employed in the pressure chamber is below the decomposition point of the cellulose derivative, for example, for cellulose acetate temperatures up to 200, 220 or 240° C. may be used. Heating of the pressure chamber may be carried out in any convenient way, for example by steam or oil heating jackets round the pressure chamber or by means of electrical resistances.

The pressure varies in accordance with the type of solution employed and the nature of the products desired, and may, for example, be 1000 lbs. per square inch or may range up to 2-4 thousand pounds per square inch or more. The pressure may be applied by means of a piston operated by a separate pressure cylinder or by mechanical means such as a screw, or fluid pressure may be used, e. g., hydraulic pressure or compressed air. For the maintenance of uniformity in an extruded product, the pressure means should be such as to "follow up" the mass during its extrusion from the pressure chamber. For instance, in the case of compositions contain- 45% cellulose acetate composition mentioned above, extrusion may be extremely rapid, and it is therefore important that there should be no substantial falling off of pressure as the composition is expelled from the pressure chamber.

As indicated above, the composition to be expanded or extruded consists primarily of the cellulose derivative and a proportion of a liquid solvent for the cellulose derivative. The liquid content may, however, include a small proportion of a non-solvent, for example water, the evaporation of which also assists in the expansion of the extruded material. Other solid materials than the cellulose derivative may also be included, for example a small proportion of a water-repellent material may be used to render the final product particularly resistant to the absorption of water or water vapour. Likewise, fillers may be added for the purpose of modifying the appearance and properties of the final product, for example colouring matter; metal powders or other pigments; fire retardants; asbestos, cellulose, or other fibres; plasticisers; and simple fillers such as kieselguhr and fuller's earth.

Because of the low specific gravity of the expanded product the material is particularly useful for such purposes as heat insulation, especially where low temperatures are to be dealt with, as in refrigeration. It may likewise be used for sound insulation. Again it may be employed for such purposes as life belts, especially when containing or subsequently coated or treated with water-repellent materials which add to the inherent water-resistant properties of cellulose derivatives such as cellulose acetate. Again, because of its extreme lightness it may be utilised for filling vacant portions of the structure of aeroplanes so as to impart buoyancy in the event of forced descents on water. Although the material may be packed into life belts, etc., as a loose mass, for example the thread-like mass described above, it may previously be formed into slabs or blocks of any desired shape, especially when the form of the material is such as to give the slabs or blocks substantial rigidity, or rods of the material may be built up into blocks, e. g., by causing an assembly of rods to adhere to each other by spraying or otherwise applying a liquid containing a solvent such as acetone for the cellulose derivative. In this way the greatest advantaage of the extreme lightness of the material may be utilised. The moulding of such blocks or slabs may be carried out in such a way as to give them a smooth external surface which may be varnished or otherwise rendered water-resistant.

In spite of its great lightness the material may be formed into articles of substantial rigidity and strength, especially when shaped by means of moulds. In this form the material may be used for constructional purposes, especially where great lightness is desirable.

Apart from cellulose acetate, other cellulose derivatives which may be employed according to the invention are cellulose acetate, propionate, butyrate, aceto-propionate and acetobutyrate and ethyl, methyl and benzyl cellulose. Other solvents which may be used are methyl ethyl ketone, acetaldehyde, dioxane, ethylene methylene ether, methyl or ethyl formate, methyl acetate, the lower alcohols and benzene (these last two types especially for cellulose ethers) and certain solvent mixtures, e. g., ethyl alcohol-benzene.

Several forms of apparatus suitable for carrying the invention into effect will now be described in greater detail with reference to the accompanying drawing, all of which are diagrammatic in character and are sectioned where necessary to show the general construction.

Fig. 1 shows a pressure chamber from which the material may be suddenly expelled or in which sudden expansion may be permitted;

Fig. 2 shows an apparatus fitted with a mould for shaping the expanded material;

Fig. 3 shows a detail of Fig. 2;

Figs. 4, 5 and 6 show some of the forms into which the material may be moulded;

Fig. 7 shows a mould suitable for use with the apparatus of Fig. 2 for the purpose of moulding tubular products;

Fig. 8 is a section taken on the line 8—8 of Fig. 7;

Fig. 9 shows a simple tubular product that can be made with a mould of the kind shown in Figs. 7 and 8.

Fig. 10 shows apparatus similar to Fig. 2 provided with feed means for the production of substantial lengths of the expanded material;

Fig. 11 shows an apparatus for the production of moulded slabs of expanded material;

Fig. 12 shows another form of apparatus for moulding slabs;

Fig. 13 shows apparatus in which the pressure is exerted by screw means; and

Fig. 14 shows apparatus for the production and collection of indefinite lengths of fibrous material.

In Fig. 1 a cylinder 1 fitted with a heating jacket 2 has a closure plate 3 at its bottom end pivoted at 4 so that it can either be held across the opening of the cylinder by the screw 5 or quickly moved aside. A plunger 6 having a clearance within the cylinder 1 is fitted with a phosphor-bronze head 7 so that pressure can be exerted on the material 8 within the cylinder, e. g., by means of the ram 9 of a hydraulic cylinder 10.

The cross-section of the cylinder 1 may be circular or otherwise, the plunger head 7 being appropriately shaped. The cylinder is filled with slugs or discs cut from cellulose acetate sheets prepared by working a solution of cellulose acetate or malaxating rolls until the content of the material is approximately 85% cellulose acetate and 15% solvent, e. g., acetone. By using pieces cut to fit the cylinder closely, the amount of entrapped air can be considerably reduced. Heat is steadily applied by the jacket 2 until the temperature of the material 8 is approximately 210° C. During the heating, pressure of say 3000 lbs. per sq. inch is applied by the ram 9 so that by the combined action of heat and pressure the material is rendered fluid. At the same time entrapped air may be expelled. When the heating is continued sufficiently for the material to be substantially uniformly fluid, the ram 9 may be quickly withdrawn to allow the material 8 to expand within the cylinder 1. When the cylinder has cooled the hardened mass of material may be removed from the cylinder. Alternatively, the closure plate 3 may be slid away from the bottom of the cylinder to allow the material to expel itself in expanded form from the cylinder. The cross-section of the expelled material corresponds to that of the cylinder but some lateral expansion may take place.

In Fig. 2 the material 11 contained in the cylinder 12 having a jacket 13 is expelled by continued pressure on the plunger 14 through the cylinder outlet 15 upon release of the cock 16 when the material has become sufficiently fluid under the action of the heat and pressure. Below the cock 16 is a jet member 17 having an orifice 18 of say ¼" diameter. Fitting the jet 17 is a mould 19 which is filled by the material expanding through the orifice 18. The material sets in the mould 19, which can be rapidly cooled and the material can then be removed. As the material contacts with the wall of the mould it forms a fairly smooth skin but the interior of the material is cellular in character. The continuous cellular structure coupled with the formation of the smooth skin imparts considerable rigidity to the rod-like material formed in this way.

Figs. 4, 5 and 6 show various cross-sections of material that may be formed by the use of appropriately sectioned moulds 19. It will be seen that concave and convex sided sections may be formed. More complex moulds may, of course, be used.

The mould 20 shown in Fig. 7 is fitted with a central rod 21 positioned by the fins 22 shown in Fig. 8 and also by the removable cap 23. This mould enables hollow tubular products to be formed as shown in Fig. 9. Release holes in the cap 23 permit the escape of air and indicate when the mould has been filled.

Fig. 10 shows an apparatus similar to that of Fig. 2 with a short shaping tube 24 from which the extruded cellular rod is directed to pairs of corrugated feed rolls 25, which lightly grip the rod and enable it to be formed into considerable lengths within the capacity of the pressure cylinder 26. Extrusion may, however, be direct into the atmosphere. Some lateral expansion takes place, a jet hole of $\frac{5}{32}$ inch giving a rod approximately ¾ inch thick.

In Fig. 11 a mould 27 having the desired cross-section is provided with a heating jacket 28 and an appropriate plunger 29 connected by toggle links 30 to a lever 31 actuated by a ram 32. When the material 33, which may be in the form of sheets cut to the shape of a mould or chips, slugs or powder formed from suitable sheets, has reached the required temperature and pressure the toggle links 30 may be broken as indicated in dotted lines to permit the plunger to rise quickly under the expansive action of the material. In this way the material is formed into a block or slab having the configuration of the mould 27.

Fig. 12 shows an apparatus to which pressure may be applied, e. g., by a ram 34 during preliminary heating, the pressure being maintained by locking the plunger 35 to the cylinder 36 while the material 37 is brought to substantially uniform temperature throughout, e. g., in a stove capable of dealing with a number of mould assemblies. When the locking means, e. g., the pins 38, are withdrawn the material 37 expands in the casing.

As already indicated considerable pressure of the order of 3000-4000 pounds per square inch may be necessary to bring the heated material to the desired degree of fluidity and to bring about rapid expulsion of the material from the heating cylinder. Fig. 13 shows diagrammatically a ram 39 provided with a screw 40 for pressure to be applied by means of worm gear 41. When the closure plate 42 is removed, the worm gear 41 can be quickly actuated to maintain the pressure in the cylinder as the material 43 is extruded. When, however, the material is permitted to expand within the pressure cylinder it may be more convenient to use a hydraulic ram as already described with reference to Figs. 1 and 12, since such a ram can be withdrawn to secure rapid expansion of the material. Thus, in the apparatus of Fig. 1, the ram 9 may be withdrawn after the plunger 6 has completed its stroke, the pressure being maintained by means of latches 44 engaging the head 45 of the plunger. These latches can be knocked out of engagement with the head to permit the material to raise the plunger rapidly.

In Fig. 14 a pressure cylinder 46 similar to the one shown in Fig. 2 has a release cock 47 and a jet 48, the latter discharging directly into the atmosphere. The material in the cylinder 46 is a solution of cellulose acetate in acetone or acetone/water (e. g., 95/5) of approximately 45% concentration. With the orifice in the jet 48 of about ¼ inch diameter, the material is extruded from the cylinder 46 in the form of a fibrous thread of continuous structure but consisting of fine fibres having various deniers, e. g. from 0.5–8.0. The average denier of the product is approximately 600. The rate of extrusion is very high, e. g., 5000–6000 meters per minute. The product may be conveniently collected in a can 49. The product may be withdrawn from the can and twisted.

Having described my invention, what I desire to secure by Letters Patent is:

1. Process for the production of thermoplastic material in cellular form comprising malaxating a thermoplastic material with a liquid, which is a solvent therefor at ordinary temperatures and pressures, in such proportions as to form a plastic composition that is not flowable under ordinary temperatures and pressures, subjecting said composition to elevated temperature and pressure while restraining said composition until its temperature is substantially uniform and then suddenly freeing the composition from the restraint so that the consequent sudden release of the pressure permits rapid vaporization of the solvent and drying of the material into a mass of low specific gravity.

2. Process for the production of thermoplastic material in cellular form comprising malaxating a thermoplastic material with a liquid, which is a solvent therefor at ordinary temperatures and pressures, in such proportions as to form a plastic composition that is not flowable under ordinary temperatures and pressures, subjecting said composition within a closed chamber to elevated temperature and pressure while restraining said composition within said chamber until its temperature is substantially uniform and then suddenly permitting the composition to expand within the chamber, the consequent sudden release of the pressure permitting rapid vaporization of the solvent and drying of the material into a mass of low specific gravity.

3. Process for the production of thermoplastic material in cellular form comprising malaxating a thermoplastic material with a liquid, which is a solvent therefor at ordinary temperatures and pressures, in such proportions as to form a plastic composition that is not flowable under ordinary temperatures and pressures, subjecting said composition within a closed chamber to elevated temperature and pressure while restraining said composition within said chamber until its temperature is substantially uniform and then suddenly freeing the composition from the restraint of the chamber and permitting it to expand freely from the chamber, the consequent sudden release of the pressure permitting rapid vaporization of the solvent and drying of the material into a mass of low specific gravity.

4. Process for the production of thermoplastic material in cellular form comprising malaxating a thermoplastic material with a liquid, which is a solvent therefor at ordinary temperatures and pressures, in such proportions as to form a plastic composition that is not flowable under ordinary temperatures and pressures, subjecting said composition within a closed chamber to elevated temperature and pressure while restraining said composition within said chamber until its temperature is substantially uniform and then suddenly permitting said composition to expand into a mold connected to the chamber, the consequent sudden release of the pressure permitting rapid vaporization of the solvent and drying of the material into a mass of low specific gravity.

5. Process for the production of thermoplastic material in cellular form comprising malaxating a thermoplastic material with a liquid, which is a solvent therefor at ordinary temperatures and pressures, in such proportions as to form a plastic composition that contains at least 80% of the thermoplastic material and is not flowable under ordinary temperatures and pressures, subjecting said composition to elevated temperature and pressure while restraining said composition until its temperature is substantially uniform and then suddenly freeing the composition from the restraint so that the consequent sudden release of the pressure permits rapid vaporization of the solvent and drying of the material into a mass of low specific gravity.

6. Process for the production of thermoplastic material in cellular form comprising malaxating a thermoplastic material with a liquid, which is a solvent therefor at ordinary temperatures and pressures, in such proportions as to form a plastic composition that is just not flowable under ordinary temperatures and pressures, subjecting said composition to elevated temperature and pressure while restraining said composition until its temperature is substantially uniform and then suddenly freeing the composition from the restraint so that the consequent sudden release of the pressure permits rapid vaporization of the solvent and drying of the material into a mass of low specific gravity.

7. Process for the production of thermoplastic material in cellular form comprising malaxating a thermoplastic material with a liquid, which is a solvent therefor at ordinary temperatures and pressures, in such proportions as to form a plastic composition that is just not flowable under ordinary temperatures and pressures, subjecting said composition within a closed chamber to elevated temperature and pressure while restraining said composition within said chamber until its temperature is substantially uniform and then suddenly freeing the composition from the restraint of the chamber and permitting it to expand freely from the chamber, the consequent sudden release of the pressure permitting rapid vaporization of the solvent and drying of the material into a mass of low specific gravity.

WILLIAM IVAN TAYLOR.